(12) United States Patent
Cha et al.

(10) Patent No.: US 12,244,764 B2
(45) Date of Patent: *Mar. 4, 2025

(54) CAPTIONED TELEPHONE SERVICE SYSTEM FOR PROVIDING ORIGINAL NUMBER SERVICE AND ANTI-SPAM FUNCTION

(71) Applicant: Mezmo Corporation, Buena Park, CA (US)

(72) Inventors: Wonjae Cha, Irvine, CA (US); Jong Oh Choi, Siheung (KR); John Lee, Irvine, CA (US)

(73) Assignee: Mezmo Corporation, Buena Park, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 17/890,211

(22) Filed: Aug. 17, 2022

(65) Prior Publication Data

US 2024/0064232 A1 Feb. 22, 2024

(51) Int. Cl.
*H04M 3/436* (2006.01)
*H04M 3/42* (2006.01)

(52) U.S. Cl.
CPC ......... *H04M 3/436* (2013.01); *H04M 3/4211* (2013.01); *H04M 3/42382* (2013.01); *H04M 3/42391* (2013.01)

(58) Field of Classification Search
CPC ............... H04M 3/436; H04M 3/4211; H04M 3/42382; H04M 3/42391; H04M 3/42059; H04M 3/54
See application file for complete search history.

(56) References Cited

U.S. PATENT DOCUMENTS

| | | | | |
|---|---|---|---|---|
| 7,613,286 B2* | 11/2009 | Hong | ..................... | H04M 3/436 379/221.09 |
| 8,416,925 B2* | 4/2013 | Engelke | ............... | H04M 1/2473 379/52 |
| 9,591,131 B2* | 3/2017 | Quilici | ................... | H04M 3/436 |
| 10,505,889 B2* | 12/2019 | Lew | ........................ | H04L 51/52 |
| 11,546,465 B2* | 1/2023 | Lee | ......................... | G10L 15/26 |
| 11,889,020 B2* | 1/2024 | Patel | ........................ | H04M 3/53 |
| 2022/0086269 A1* | 3/2022 | Gao | ........................ | H04M 1/663 |
| 2024/0242706 A1* | 7/2024 | Kutchko | .................. | G10L 25/51 |

* cited by examiner

*Primary Examiner* — Lisa Hashem
(74) *Attorney, Agent, or Firm* — Heedong Chae; Lucem, PC

(57) ABSTRACT

A captioned telephone service (CTS) system for blocking spam calls includes a CTS server and a database. A CTS user's equipment is associated with a CTS number and an original phone number. The CTS server is configured to allow the user to elect to use an original number service and a call drop service. If the original number service is set, when the user places a phone call to a peer by using the CTS number, the original phone number, instead of the CTS number, is displayed as caller identification on a communications device of the peer. The CTS server assists the user to set up call forwarding and checks whether the call forwarding was successfully set. If the call drop service is set, the CTS server drops a call, directed to the CTS number. However, emergent calls or emergency related calls are excluded from the call drop service.

20 Claims, 3 Drawing Sheets

100

CAPTIONED TELEPHONE SERVICE SYSTEM FOR PROVIDING ORIGINAL NUMBER SERVICE AND ANTI-SPAM FUNCTION

FIELD OF THE INVENTION

The present invention relates to a captioned telephone service ("CTS") CTS system and method for providing an original number service and an anti-spam function. In particular, the present invention relates to the CTS system and method to drop a call directed to the assigned CTS number if the user of the captioned telephone service elects to use the original number service and the call drop service. When the user uses his own mobile communications device for the captioned telephone service, a CTS number is assigned to the user's device and the user's device may receive unwanted calls directed to the CTS number. The present invention is directed to block such unwanted calls.

BACKGROUND OF THE INVENTION

A captioned telephone service, also known as CTS (herein after referred to as "CTS", "captioned telephone service", or "transcription service"), is used to help a person, typically one who is deaf or hard of hearing but can speak, to make phone calls. A CTS system allows a person who is deaf or hard of hearing (the CTS user) to have a phone call with another person (a peer) who may or may not be deaf or hard of hearing such that the CTS system receives the peer's voice, transcribes it into caption data, and sends the caption data to the CTS user's equipment to be displayed as text.

The CTS user's equipment may be the user's own communications device such as a mobile wireless device, mobile phone, smart phone, landline phone, etc., or a terminal provided by a CTS provider. When the user uses his own communications device, the user has to make an additional call to use the captioned telephone service, namely calling the CTS provider. In order to address this inconvenience of calling twice, the CTS provider provides an application to be installed on the CTS user's equipment so that the user can place a call to the peer by using the application without the need to additionally call the CTS provider. However, the captioned telephone service cannot be automatically provided when the peer calls the user to the CTS user's own communications device by using the user's original phone number. To address this problem, the CTS provider assigns a CTS number to the application installed on the CTS user's equipment so that the peer can call the CTS number in order for the user to use the captioned telephone service. In other words, the CTS number is a phone number associated with the CTS user's equipment so that the user can place or receive a phone call by using the CTS number in order to use the captioned telephone service. As a result, the CTS user's equipment has its own original phone number, which is assigned by the mobile network carrier, wireless network carrier, or landline service provider (hereinafter representatively referred to as a "carrier"), and the CTS number assigned by a CTS provider.

When the CTS user's equipment has two telephone numbers of the original phone number and the CTS number which are respectively assigned by a carrier and a CTS provider, the peer has to call the CTS number in order for the user to use the captioned telephone service. If the peer calls the original phone number, the user cannot use the captioned telephone service right away. Thus, it is inconvenient for the peer to have two phone numbers of the user, which can be confusing. The peer may be confused to find out which number is for the captioned telephone service.

Furthermore, there may be a previous owner of the CTS number, and the new owner of the CTS number, namely, the user, may receive spam calls, robocalls, unsolicited calls, undesirable calls, or unwanted calls (hereinafter collectively referred to as "spam calls") called to or directed to the CTS number. Such spam calls are annoying, waste the user's time, and may lead to frauds, and thus, spam calls need to be blocked or minimized.

Therefore, to solve the above problems, CTS system and method to provide the original number service and call drop service are provided to block spam calls directed to a CTS number, as there is a need for such a system and a method that accomplish this goal.

This invention is directed to solve these problems and satisfy the long-felt need.

SUMMARY OF THE INVENTION

The present invention contrives to solve the disadvantages of the prior art. The present invention provides CTS system and method for providing an original number service and a call drop service.

The object of the present invention is to provide a CTS system for blocking spam calls which includes a CTS server and a database. The CTS server provides a transcription service to a user and the database stores information about the user. The CTS server is constructed to be connected to a CTS user's equipment which is associated with a CTS number and an original phone number such that the CTS number is assigned by a CTS provider and the original phone number is assigned by a carrier. The CTS server is configured to allow the user to elect to use an original number service such that the user places a phone call to a peer by using the CTS number in order to use the transcription service, but the original phone number, instead of the CTS number, is displayed as a caller identification ("caller ID") on a communications device of the peer. If the user sets up call forwarding with the carrier in order to forward a call directed to the original phone number to the CTS number, the peer can continue to call the user using the user's original phone number, and the captioned telephone service can be provided to the user.

If the user elects to use the original number service, the CTS server is configured to assist the user to set up call forwarding and to check whether the call forwarding was successfully set. The present invention further provides a call drop service to the user. If the user elects to use the original number service and the call drop service and the settings for the original number service and the call drop service are completed, the CTS server is configured to drop a call, directed to the CTS number. If the value of the call forward control value is "on" and the user elects to use the call drop service, the CTS server is configured to drop an inbound call which is called to the CTS number. However, emergent calls or emergency related calls should be excluded from the call drop service. Thus, if the inbound call is from an emergency center, the CTS server is configured not to drop the inbound call. Furthermore, if the time gap between the inbound call and the user's latest outbound call is smaller than a predetermined time, the CTS server does not drop the inbound call because the inbound call may be a return call from an emergency center.

Another object of the present invention is to provide a system for blocking spam calls in a captioned telephone service which includes: a CTS system for providing a transcription service and a CTS user's equipment where the CTS system includes a CTS server and a database. The CTS server is configured to allow the user to elect to use an original number service and a call drop service.

If the user elects to use the original number service, the CTS server is configured to assist the user to set up call forwarding and to check whether the call forwarding was successfully set. If the user elects to use the original number service and the call drop service and the settings for the original number service and the call drop service are completed, the CTS server is configured to drop a call, directed to the CTS number. However, the CTS server does not drop the inbound call if it is from an emergency center or if the time gap between the inbound call and the user's latest outbound call is smaller than a predetermined time.

The advantages of the present invention are: (1) the CTS server of the present invention provides the original number service and the call drop service; (2) when the call drop service is set, the CTS server drops a call directed to the CTS number of the user's equipment, and thus, the present invention blocks or reduces spam calls directed to the CTS number; (3) the present invention provides a system and process to assist the user to set up call forwarding as part of setting the original number service; (4) the present invention provides a system and process to check whether the call forwarding was successfully set as part of setting the original number service; (5) the present invention provides a system and process to exclude emergency calls or emergency related calls from the call drop service; (6) the present invention allows the user to use his original phone number as his representative contact instead of the CTS number; (7) the peer does not have to save two numbers of the user because only the original phone number is displayed as the caller ID on the peer's communications device and the captioned telephone service can be used even if a call is made to the original phone number.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment. Additionally, in all of the embodiments detailed below, call forwarding includes call routing.

Figure 1:
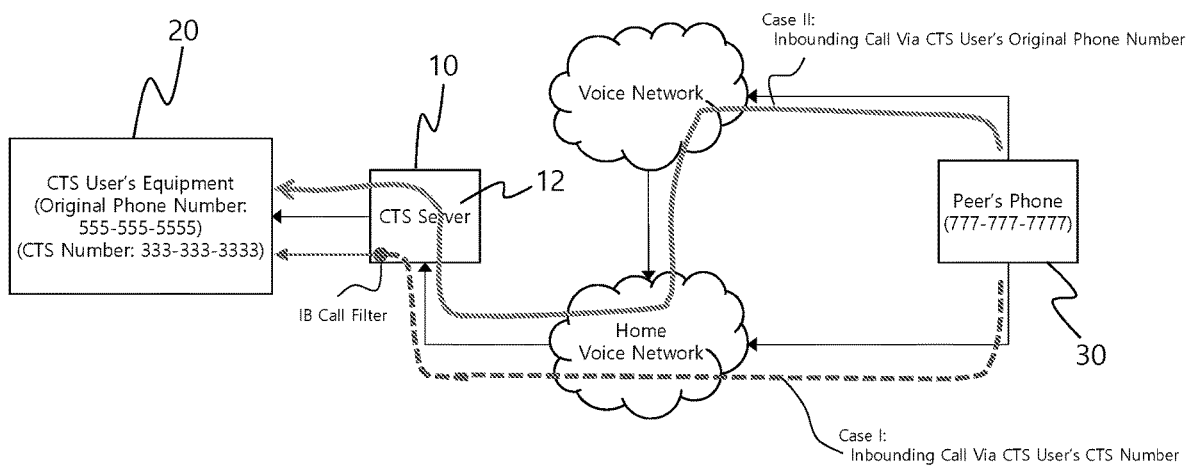
FIG. 1 is a schematic diagram of the CTS system according to the present invention that provides an original number service and a call drop service.

FIG. 1 shows a schematic diagram of the CTS system 10 according to the present invention that provides an original number service and a call drop service. The original number service may be called in different names such as one number service, CTS number hiding function, or the like.

The CTS system 10 of the present invention for blocking spam calls includes a CTS server 12 and a database where the CTS server 12 provides a transcription service to a user of the CTS system 10 and the database stores information about the user. The database may be a part of the CTS server 12 or an element separate from the CTS server 12. The CTS server 12 is constructed to be connected to a CTS user's equipment 20 which is associated with a CTS number and an original phone number such that the CTS number is assigned by a CTS provider and the original phone number is assigned by a carrier. The CTS user's equipment 20 has its own original phone number if it is the user's own communications device such as a mobile wireless device, mobile phone, smart phone, etc. Using either the CTS number or the original phone number, the CTS user's equipment 20 can place or receive a phone call to or from a peer 30. However, the user can use the captioned telephone service when he places or receive a phone call to or from a peer 30 by using an application provided by the CTS provider and installed on the CTS user's equipment 20.

The CTS server 12 is configured to allow the user to elect to use an original number service such that the user places a phone call to a peer 30 by using the application and the CTS number assigned to the application of the CTS user's equipment 20 in order to use the transcription service, but the original phone number, instead of the CTS number, is displayed as a caller identification ("caller ID") on a communications device of the peer 30. When the user places a phone call by using the CTS number, the user's equipment 20 is connected to the CTS server 12, and then the CTS server 12 is connected to the communications device of the peer 30 by using the original phone number of the user 20 as a caller ID to be displayed on the communications device of the peer 30. If the user sets up call forwarding with the carrier in order to forward a call directed to the original phone number to the CTS number, the peer 30 can continue to call the user 20 by using the user's original phone number, and the captioned telephone service can still be provided to the user 20 even if the call to the original phone number was initiated by the peer 30 and even if the call was made to the original phone number, instead of the CTS number.

The original number service of the present invention allows the user to use the captioned telephone service even if the call to the original number was initiated by the peer 30. Conventionally, the user has to call a CTS provider after receiving a call from a peer 30 in order to use the captioned telephone service. When a CTS number is assigned to the user 20, the peer 30 may call the CTS number to be connected to the user 20 so that the user can use the captioned telephone service. However, the user has to give the CTS number to his peers 30 and the peers 30 will end up having two numbers of the original phone number and the CTS number for the user. The peers 30 may be confused between the two numbers and confused to figure out which number provides the captioned telephone service.

If the user elects to use the original number service, the CTS server 12 is configured to assist the user to set up call forwarding and to check whether the call forwarding was successfully set. Furthermore, the present invention provides a call drop service to the user. If the user elects to use the original number service and the call drop service and the settings for the original number service and the call drop service are completed, then the CTS server 12 or an inbound call filter of the CTS server 12 is configured to drop a call which is called or directed to the CTS number (here, "called and "directed to" have the same meaning).

Figure 2:
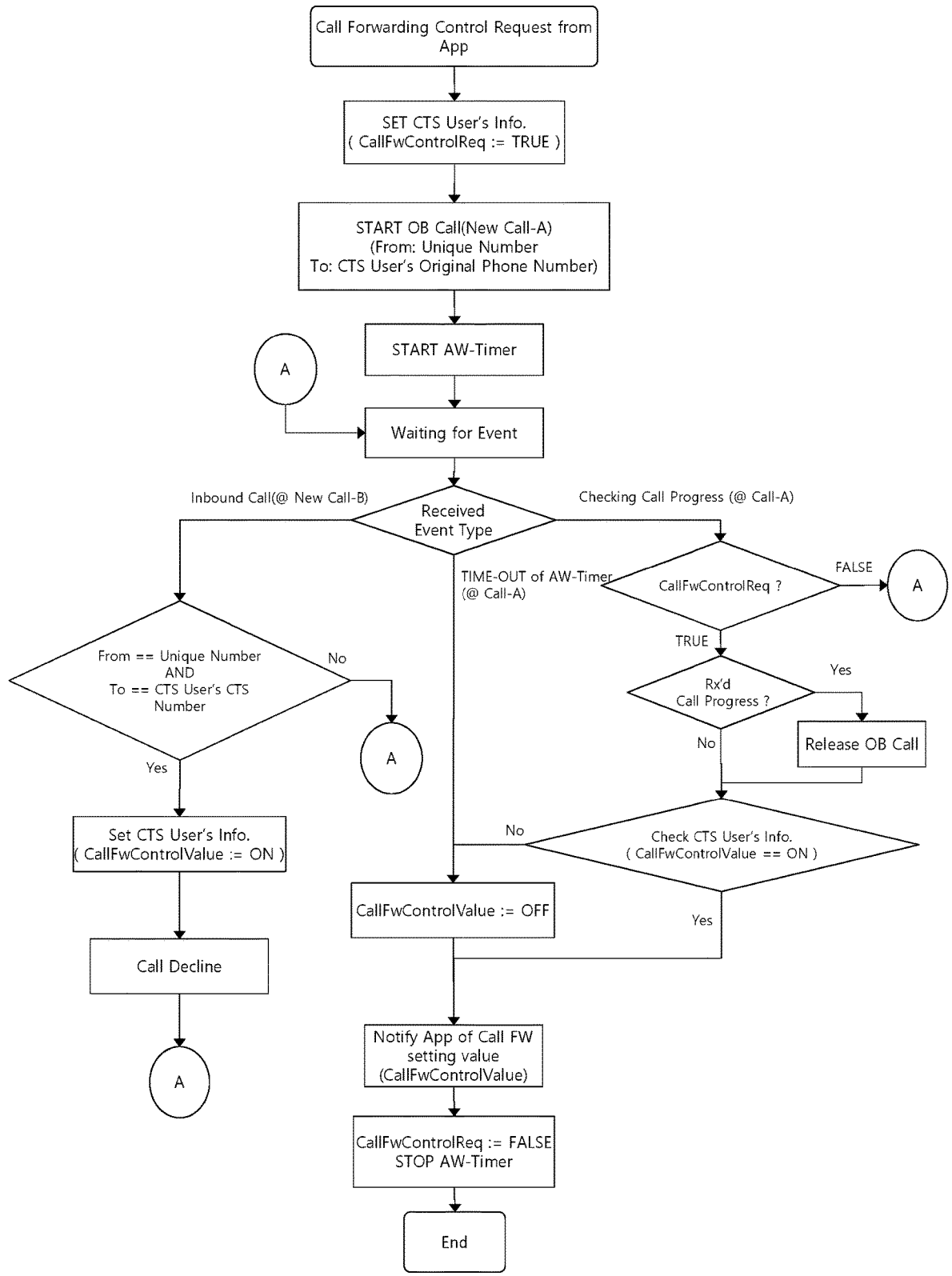
FIG. 2 is a schematic flowchart of a process to check whether the original number service is enabled.

FIG. 2 shows a schematic flowchart of a process to check whether the original number service is enabled. If the user elects to use the original number service, the CTS server 12 is configured to: find out the carrier associated with the original phone number; retrieve a feature code of the carrier for call forwarding; and forward the feature code of the carrier for call forwarding to the CTS user's equipment 20 in order to help the user set up call forwarding to forward incoming calls directed to the original phone number to the CTS number. Furthermore, if the user elects to use the original number service, the CTS server 12 is further configured to forward the CTS number together with the feature code of the carrier for call forwarding. If the user 20 calls the feature followed by the CTS number by using the user's equipment 20, the call is connected to the home location register of the carrier and call forwarding is set. Then, the application installed on the user's equipment 20 sends a request to the CTS server 12 to test the call forwarding. Preferably, the CTS server 12 forwards the feature code followed by the CTS number in the form of a hyperlink so that touching or clicking the hyperlink automatically initiates a call.

In addition, the application installed on the user's equipment 20 can identify the carrier associated with the original phone number and forward it to the CTS server 12.

If the user elects to stop using the original number service, the CTS server 12 is configured to: find out the carrier associated with the original phone number; retrieve a feature code of the carrier for resetting call forwarding; and forward the feature code of the carrier for resetting call forwarding to the CTS user's equipment 20 in order to help the user reset the call forwarding to stop forwarding incoming calls directed to the original phone number to the CTS number. Here, "resetting call forwarding" means removing the call forwarding function so that the call is directed to the original phone number as in the default setting.

If the user elects to use the original number service, the CTS server 12 is configured to check whether the user completed to set up call forwarding by: placing an outbound call from a unique number to the original phone number; and checking whether the CTS server 12 receives a call from the unique number to the CTS number. If the call forwarding is set, the outbound call from the unique number to the original phone number is routed by the carrier to the CTS number and the CTS server 12 will receive an inbound call from the unique number to the CTS number.

If the call forwarding is not set, the call from the unique number to the original phone number will not be routed to the CTS server 12, but will be made to the CTS user's equipment 20. Thus, if the CTS server 12 receives a call from the unique number to the CTS number, it means call forwarding is set. If the CTS server 12 does not receive the call from the unique number to the CTS number, it means call forwarding is not set, in which case the CTS server 12 is configured to notify the user of the result.

The database may include a parameter of a call forward control request such that the user can set a value of the call forward control request to "true" in order to elect to use the original number service. Here, instead of the values of "true" and "false", other values of "yes"/"no", "1"/"0", "on"/"off", or the like may be used. In addition, the database may further include a parameter of a call forward control value such that the CTS server 12 is configured to set the value of the call forward control value to "on" if the CTS server 12 receives an inbound call from the unique number to the CTS number after placing an outbound call from a unique number to the original phone number. If the CTS server 12 does not receive such a call, the value of the call forwarding control value is "off". Here, instead of the values of "on" and "off", other values of "true"/"false", "yes"/"no", "1"/"0", or the like may be used.

If the CTS server 12 does not receive the call from the unique number to the CTS number and there is no call progress for a predetermined waiting time after placing the outbound call, the CTS server 12 is configured to set the value of the call forward control value to "off" and notify the user's equipment 20 of the status of the original number service (the status is that call forwarding is not set yet). In addition, if the CTS server 12 does not receive the call from the unique number to the CTS number and there is a call progress after placing the outbound call, the CTS server 12 is configured to release the outbound call and notify the user's equipment 20 of the status of the original number service (the status is that call forwarding is not set yet).

FIG. 2 shows an exemplary flowchart of a process to check whether the original number service is enabled according to the present invention. An application is installed on the user's equipment 20 to use the captioned telephone service of the present invention. If the user elects to use the original number service or the call forwarding through the application, the CTS server 12 receives such an election from the application and sets the value of the call forward control request to "true" for the user's information. Then, the CTS server 12 starts an outbound test call (call-A) from a unique number to the original phone number of the user. Preferably, the unique number may be a number being easily differentiated from other ordinary telephone numbers.

After starting the outbound test call, the CTS server 12 starts an awaiting time timer and waits for an event. The event may be an inbound call (call-B), a time out of the awaiting time, or checking call progress.

If there is an inbound call (call-B), the CTS server 12 checks whether the inbound call is from the unique number to the CTS number of the user. If it is, that means call forwarding is successfully set, and the CTS server 12 sets the value of the call forward control value as "on". Then, if the user elects to use the call drop service, the CTS server 12 begins to drop calls directed to the CTS number. In other words, the CTS server 12 drops the call if the call is to the CTS number. The CTS server 12 does not drop the call if the call is from the CTS number, which means the user placed the call to the CTS server 12 in order to use the captioned telephone service. If the inbound call is not from the unique number or not to the CTS number of the user, it means call forwarding is not set yet.

If the event is a time out of the awaiting time, the CTS server 12 sets the value of the call forward control value as "off", notifies the application of the call forward control value of "off", sets the value of the call forward control request as "false", and stops the awaiting time timer.

The CTS server 12 is configured to check whether there is a call progress after the outbound call (call-A). Before checking whether there is a call progress, the CTS server 12 checks the value of the call forward control request. If the value of the call forward control request is "true", then the CTS server 12 checks whether there is a call progress. If there is a call progress, it means the call is not forwarded to the CTS number because there was no inbound call from the unique number to the CTS number of the user. So, if there is a call progress, the CTS server 12 releases the outbound test call and checks the value of the call forward control value for the user. If the value of the call forward control value is "on", it means call forwarding was already set, and the CTS server 12 notifies the application of the call forward control value of "on", and stops the awaiting time timer. If the value of the call forward control value is not "on", the value of the call forward control value is "off", and the CTS server 12 notifies the application of the call forward control value of "off", sets the value of the call forward control request as "false", and stops the awaiting time timer.

Figure 3:
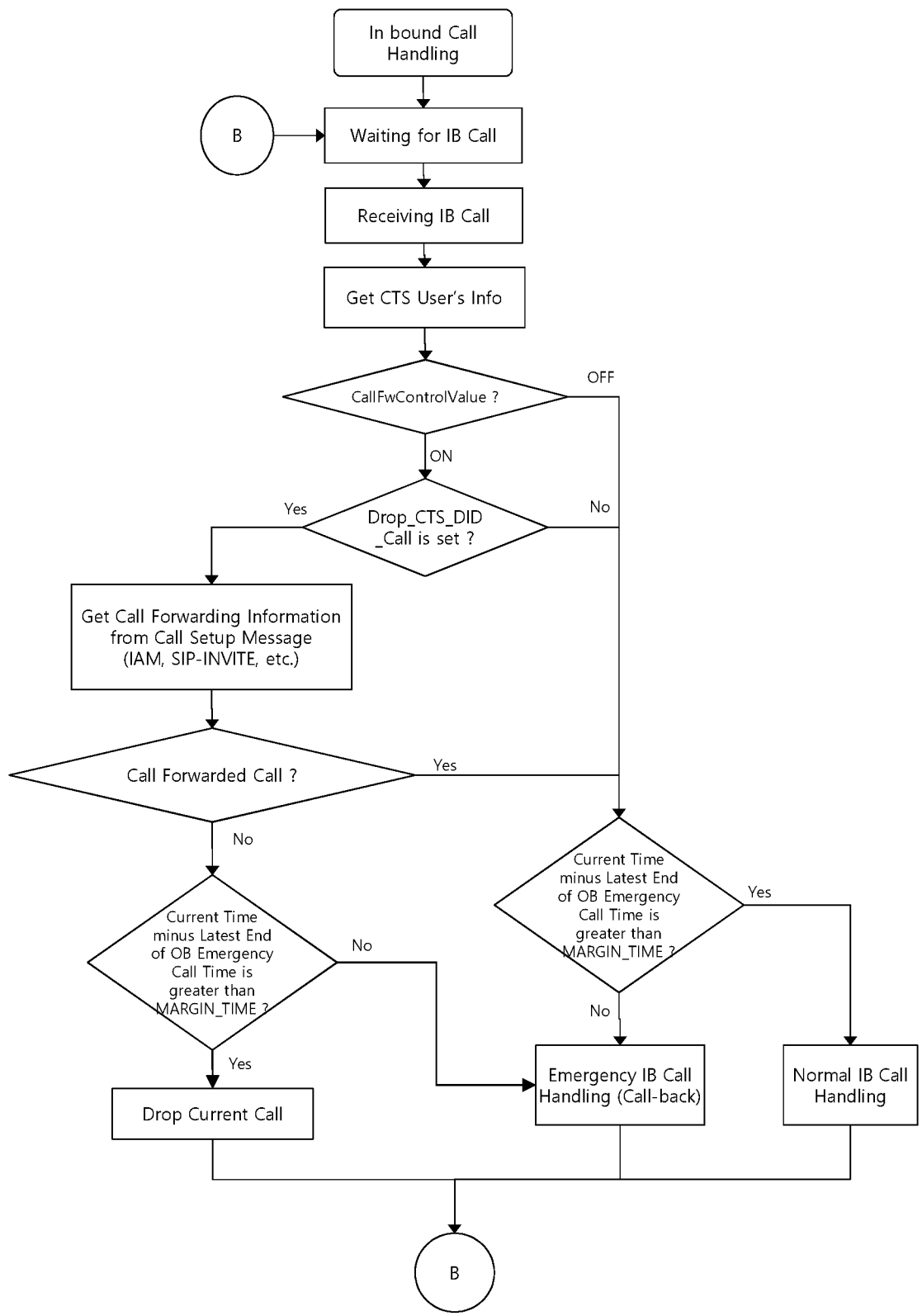
FIG. 3 is a schematic flowchart of a process for the call drop service.

FIG. 3 shows a schematic flowchart of a process for the call drop service according to the present invention. If the value of the call forward control value is "on" and the user elects to use the call drop service, then the CTS server 12 is configured to drop an inbound call which is called to the CTS number. The CTS server 12 does not drop such an inbound call if the call is from the CTS number. If the value of the call forward control value is not "on" or the user did not elect to use the call drop service, the CTS server 12 does not drop an inbound call which is called to the CTS number.

Emergent calls or emergency related calls should be excluded from the call drop service. Thus, if the inbound call is from an emergency center, the CTS server 12 is configured not to drop the inbound call even if the value of the call forward control value is "on" and the user elects to use the call drop service. The database may include a list of phone numbers for such emergency centers, which may include medical centers, health care facilities, 911 emergency services, law enforcements, fire or disaster related centers, etc.

An emergency center may use a direct inward dialing, having a main reception line and a number of virtual numbers. Many of the virtual numbers may not be stored in the database, and a call from such a virtual number may not be recognized as a call from an emergency center. Accordingly, to cover the cases where emergency phone number is not stored in the database, the CTS server 12 is configured not to drop the inbound call, which is called to the CTS number, if the time gap between the inbound call and the user's latest outbound call is smaller than a predetermined time. If the time gap is small, there is a possibility that the user's latest outbound call was with an emergency center, the call was disconnected, and the emergency center returned a call to the user. Even if the user's original phone number was displayed as a caller ID on to the screen of the emergency center, it's possible the emergency center's return call is directed to the CTS number. Preferably, the predetermined time is 30 seconds or 20 seconds. For this function, the start and end times of each call should be time-stamped.

FIG. 3 shows an exemplary flowchart of a process for the call drop service according to the present invention. If the CTS server 12 receives an inbound call, the CTS server 12 searches the database to find out the user to which the inbound call is directed, and then, if the user was found, the CTS server 12 retrieves from the database the values of the call forward control value and election status of the call drop service for the user 20. If the value of the call forward control value is "on" and the user 20 elected the call drop service, then the CTS server 12 retrieves the call forwarding information from a call setup message such as IAM, SIP-INVITE, etc. If the inbound call is not a forwarded call, it means the inbound call is directed to the CTS number of the user 20 and the CTS server 12 checks whether the time gap between the inbound call and the user's latest outbound call is smaller (or greater) than a predetermined time. If the time gap is greater than the predetermined time, the CTS server 12 drops the inbound call. If the time gap is not greater (or smaller) than the predetermined time, the CTS server 12 does not drop the inbound call and handles it as an emergency call-back.

If the value of the call forward control value is not "on", or the user did not elect the call drop service, or the inbound call is a forwarded call, then the CTS server 12 checks whether the time gap between the inbound call and the user's latest outbound call is smaller (or greater) than a predetermined time. If the time gap is greater than the predetermined time, the CTS server 12 handles the inbound call as a normal call whereas if the time gap is smaller than the predetermined time, the CTS server 12 handles the inbound call as an emergency call-back.

In the alternative embodiment, the system 100 for blocking spam calls in a captioned telephone service ("CTS") includes: a CTS system 10 for providing a transcription service and a CTS user's equipment 20 where the CTS system 10 includes a CTS server 12 and a database. The alternative embodiment includes major structures or features which are identical or similar to the embodiment explained above, and thus, duplicative structures or features may be omitted.

The CTS user's equipment 20 is associated with a CTS number and an original phone number such that the CTS number is assigned by a CTS provider and the original phone number is assigned by a carrier. The CTS user's equipment 20 is configured to place or receive a phone call by using either the CTS number or the original phone number. The CTS server 12 is configured to allow the user 20 to elect to use an original number service such that the user 20 places a phone call to a peer 30 by using the CTS number in order to use the transcription service, but the original phone number is displayed as a caller ID on a communications device of the peer 30. If the user elects to use the original number service and a call drop service and settings for the original number service and the call drop service are completed, the CTS server 12 is configured to drop a call directed to the CTS number.

If the user elects to use the original number service, the CTS server 12 is configured to: find out the carrier associated with the original phone number; retrieve a feature code of the carrier for call forwarding; and forward the feature code of the carrier for call forwarding to the CTS user's equipment 20 in order to help the user set up a call forwarding to forward incoming calls directed to the original phone number to the CTS number. If the user elects to stop using the original number service, the CTS server 12 is configured to: find out the carrier associated with the original phone number; retrieve a feature code of the carrier for resetting call forwarding; and forward the feature code of the carrier for resetting call forwarding to the CTS user's equipment 20 in order to help the user reset the call forwarding to stop forwarding incoming calls directed to the original phone number to the CTS number.

If the user elects to use the original number service, the CTS server 12 is configured to check whether the user completes to set up a call forwarding by: placing an outbound call from a unique number to the original phone number; and checking whether the CTS server 12 receives a call from the unique number to the CTS number. If the CTS server 12 receives a call from the unique number to the CTS number, then call forwarding is set. Otherwise, call forwarding is not set and the CTS server 12 may be configured to notify the user 20 of it.

If the call forwarding is set and the user elects to use the call drop service, the CTS server 12 is configured to drop an inbound call which is called to the CTS number. Specifically, if the value of the call forward control value is "on" and the user elects to use the call drop service, the CTS server 12 is configured to drop an inbound call which is called to the CTS number. The CTS server 12 does not drop such an inbound call if the call is from the CTS number. If the value of the call forward control value is not "on" or the user did not elect to use the call drop service, the CTS server 12 does not drop an inbound call which is called to the CTS number.

If the inbound call is from an emergency center, the CTS server 12 is configured not to drop the inbound call even if the value of the call forward control value is "on" and the user elects to use the call drop service. As explained above, emergent calls or emergency related calls should be excluded from the call drop service. The database may include a list of phone numbers for such emergency centers, which may include medical centers, health care facilities, 911 emergency services, law enforcements, fire or disaster related centers, etc.

To cover the cases where emergency phone number is not stored in the database, the CTS server 12 is configured not to drop the inbound call, which is called to the CTS number, if the time gap between the inbound call and the user's latest outbound call is smaller than a predetermined time. If the time gap is small, there is a possibility that the user's latest outbound call was with an emergency center, the call was disconnected, and the emergency center returned a call to the user 20. Even if the user's original phone number was displayed as a caller ID on to the screen of the emergency center, it's possible the emergency center's return call is directed to the CTS number. Preferably, the predetermined time is 30 seconds or 20 seconds. For this function, the start and end times of each call should be time-stamped.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A captioned telephone service ("CTS") system for blocking spam calls, comprising:
    a CTS server for providing a transcription service to a user of the CTS system; and
    a database which stores information about the user, wherein the CTS server is constructed to be connected to a CTS user's equipment which is associated with a CTS number and an original phone number such that the CTS number is assigned by a CTS provider and the original phone number is assigned by a carrier, wherein the CTS user's equipment is configured to place or receive a phone call by using either the CTS number or the original phone number,
    wherein the CTS server is configured to allow the user to elect to use an original number service such that the user places a phone call to a peer using the CTS number in order to use the transcription service, but the original phone number is displayed as a caller identification ("caller ID") on a communications device of the peer by the CTS server,
    wherein if the user elects to use the original number service and a call drop service and a setting for call forwarding to forward a call directed to the original phone number to the CTS number is completed, the CTS server is configured to consider a call, directed to the CTS number, as a spam call and drop the call.

2. The CTS system of claim 1, wherein if the user elects to use the original number service, the CTS server is configured to:
    find out the carrier associated with the original phone number;
    retrieve a feature code of the carrier for call forwarding; and
    forward the feature code of the carrier for call forwarding to the CTS user's equipment in order to help the user set up a call forwarding to forward incoming calls directed to the original phone number to the CTS number.

3. The CTS system of claim 2, wherein if the user elects to use the original number service, the CTS server is further configured to forward the CTS number together with the feature code of the carrier for call forwarding.

4. The CTS system of claim 2, wherein if the user elects to stop using the original number service, the CTS server is configured to:
    find out the carrier associated with the original phone number;
    retrieve a feature code of the carrier for resetting call forwarding; and
    forward the feature code of the carrier for resetting call forwarding to the CTS user's equipment in order to help the user reset the call forwarding to stop forwarding incoming calls directed to the original phone number to the CTS number.

5. The CTS system of claim 1, wherein if the user elects to use the original number service, the CTS server is configured to check whether the user completes to set up a call forwarding by:
    placing an outbound call from a unique number to the original phone number; and
    checking whether the CTS server receives a call from the unique number to the CTS number.

6. The CTS system of claim 5, wherein the database includes a parameter of a call forward control request such that the user can set a value of the call forward control request to "true" or elect to use the original number service in order to set the value of the call forward control request to "true".

7. The CTS system of claim 6, wherein the database further includes a parameter of a call forward control value such that the CTS server is configured to set the value of the call forward control value to "on" if the CTS server receives a call from the unique number to the CTS number after placing an outbound call from a unique number to the original phone number.

8. The CTS system of claim 7, wherein if the CTS server does not receive the call from the unique number to the CTS number and there is no call progress for a predetermined waiting time after placing the outbound call, the CTS server is configured to set the value of the call forward control value to "off" and notify the user's equipment of status of the original number service.

9. The CTS system of claim 7, wherein if the CTS server does not receive the call from the unique number to the CTS number and there is a call progress after placing the outbound call, the CTS server is configured to release the outbound call and notify the user's equipment of status of the original number service.

10. The CTS system of claim 7, wherein if the value of the call forward control value is "on" and the user elects to use the call drop service, the CTS server is configured to drop an inbound call which is called to the CTS number.

11. The CTS system of claim 10, wherein the CTS server is configured not to drop the inbound call if the inbound call is from an emergency center.

12. The CTS system of claim 10, wherein the CTS server is configured not to drop the inbound call, which is called to the CTS number, if the time gap between the inbound call and the user's latest outbound call is smaller than a predetermined time.

13. The CTS system of claim 12, wherein the predetermined time is 30 seconds.

14. The CTS system of claim 12, wherein the predetermined time is 20 seconds.

15. A system for blocking spam calls in a captioned telephone service ("CTS"), comprising:
  a CTS system for providing a transcription service wherein the CTS system includes a CTS server and a database; and
  a CTS user's equipment which is associated with a CTS number and an original phone number such that the CTS number is assigned by a CTS provider and the original phone number is assigned by a carrier,
wherein the CTS user's equipment is configured to place or receive a phone call by using either the CTS number or the original phone number,
wherein the CTS server is configured to allow the user to elect to use an original number service such that the user places a phone call to a peer using the CTS number in order to use the transcription service, but the original phone number is displayed as a caller identification ("caller ID") on a communications device of the peer by the CTS server,
wherein if the user elects to use the original number service and a call drop service and a setting for call forwarding to forward a call directed to the original phone number to the CTS number is completed, the CTS server is configured to consider a call, directed to the CTS number, as a spam call and drop the call.

16. The CTS system of claim 15, wherein if the user elects to use the original number service, the CTS server is configured to:
  find out the carrier associated with the original phone number;
  retrieve a feature code of the carrier for call forwarding; and
  forward the feature code of the carrier for call forwarding to the CTS user's equipment in order to help the user set up a call forwarding to forward incoming calls directed to the original phone number to the CTS number.

17. The CTS system of claim 15, wherein if the user elects to stop using the original number service, the CTS server is configured to:
  find out the carrier associated with the original phone number;
  retrieve a feature code of the carrier for resetting call forwarding; and
  forward the feature code of the carrier for resetting call forwarding to the CTS user's equipment in order to help the user reset the call forwarding to stop forwarding incoming calls directed to the original phone number to the CTS number.

18. The CTS system of claim 15, wherein if the user elects to use the original number service, the CTS server is configured to check whether the user completes to set up a call forwarding by:
  placing an outbound call from a unique number to the original phone number; and
  checking whether the CTS server receives a call from the unique number to the CTS number.

19. The CTS system of claim 18, wherein if the call forwarding is set and the user elects to use the call drop service, the CTS server is configured to drop an inbound call which is called to the CTS number.

20. The CTS system of claim 15, wherein the CTS server is configured not to drop the inbound call if the inbound call is from an emergency center, and
wherein the CTS server is configured not to drop the inbound call, which is called to the CTS number, if the time gap between the inbound call and the user's latest outbound call is smaller than a predetermined time.

* * * * *